United States Patent [19]

Schaefer

[11] Patent Number: 4,566,888
[45] Date of Patent: Jan. 28, 1986

[54] BUSHING CONSTRUCTION

[75] Inventor: William L. Schaefer, Butler, Pa.

[73] Assignee: PPG Industries, Inc., Pittsburgh, Pa.

[21] Appl. No.: 741,377

[22] Filed: Jun. 5, 1985

Related U.S. Application Data

[63] Continuation-in-part of Ser. No. 635,018, Jul. 27, 1984, abandoned.

[51] Int. Cl.⁴ .............................................. C03B 37/09
[52] U.S. Cl. ................................................ 65/1; 65/2; 65/326
[58] Field of Search .................. 65/1, 2, DIG. 4, 326; 339/278 C

[56] References Cited

U.S. PATENT DOCUMENTS

| 3,160,492 | 12/1964 | Chapman et al. | 65/326 X |
| 4,017,294 | 4/1977 | Sanford et al. | 65/326 |
| 4,351,656 | 9/1982 | Jensen | 65/1 |

FOREIGN PATENT DOCUMENTS

| 791669 | 1/1980 | U.S.S.R. | 65/1 |
| 1004279 | 3/1983 | U.S.S.R. | 65/2 |

Primary Examiner—Robert Lindsay
Attorney, Agent, or Firm—John E. Curley

[57] ABSTRACT

A flat plate bushing is described which eliminates extensive precious metal use in drain and/or production bushings. The bushing utilizes a novel arrangement of insulation members and support plates that allow the bushing to be electrically heated and a novel method of connecting the bushing to a power source using the bushing face plate as the connection point is also shown.

18 Claims, 8 Drawing Figures

BUSHING CONSTRUCTION

This application is a continuation-in-part application of U.S. Ser. No. 635,018, filed July 27, 1984, now abandoned.

BACKGROUND OF THE INVENTION

In the manufacture of glass fibers, molten streams of glass are attenuated from containers known in the art as bushings through a plurality of holes or orifices and the resulting filaments are attenuated and gathered into strand form. In some instances, the filaments are chopped into discrete lengths as they are being attenuated. The containers used are typically constructed of precious metals such as platinum or alloys thereof, platinum-rhodium alloys being a typical alloy used.

The bushings used to form fibers are typically rectangular containers having sidewalls and an open top and a bottom. Tips or nozzles which communicate with orifices in the bushing bottom are provided for glass flow and by properly sizing the tips and adjusting the pull rates on the molten glass which issues through the tip, the diameter of the filaments or fibers formed is determined at a given glass temperature. Molten glass is delivered to the open top of the bushing from the forehearth. A detailed description of the fiber drawing process is contained in chapter 5 of the book "The Manufacturing Technology of Continuous Glass Fibers", K. L. Lowenstein, Elsevier Scientific Publishing Co., New York, 1973.

In a fiber forming process, many bushings are employed for a single melting furnace and the molten glass from the furnace is typically fed along a forehearth which is provided with a plurality of openings to which the bushings can be operatively connected so that glass can flow from the forehearth into each of several bushing positions. FIG. 3 of U.S. Pat. No. 3,837,823 shows a diagram of a typical melter-forehearth-bushing arrangement. Similar schemes are shown on pages 61-63 of the Lowenstein book cited herein above. The bushings are connected to the forehearth by mounting the bushing in the frame and bolting the frame to refractory blocks positioned in the forehearth openings. FIG. 2 of U.S. Pat. No. 3,837,823 and FIG. V-1 on page 91 of the Lowenstein book above cited, show typical arrangements of this connection.

When a new furnace is started, it is necessary to employ in the forehearth openings a modified bushing called a drain or starter bushing. These devices are used to remove molten glass from the furnaces and forehearths when the furnaces are started up. Using these bushings, the first made glass in the melter, forehearth and refiner is removed to dispose of subquality glass, refractory fragments from the refractory lining used in the melters, forehearths and refiners and any other debris that may be present. Thus, the furnace or melter and its associated refiners and forehearths are thoroughly cleaned of debris using molten glass flowing through the drain bushings. This procedure of using drain bushings in a large modern fiber glass making direct melt system continues until consistent quality glass is being made and takes normally from about 1 to about 5 days. Once quality glass is being produced, the drain bushings are replaced by production bushings and products are then produced on the winders or choppers used under the production bushings to attenuate the fibers issuing from the production bushings.

The drain bushings used to start up a furnace are typically similar to the production bushings except for the bottom or faceplate of the bushing. The bottom of a production bushing usually contains rows of tips associated with orifices in the bottom. The number of tips can range from 400 to 6,000 or more in a modern plant, 800 tips to 2,000 tips being typical in most operations. The drain bushings on the other hand, will have usually one to five holes, typically 2, in the bottom which are of a diameter much larger than the production bushing orifice. A drain bushing, for example, may contain two holes, usually one on each side of the bushing near the electrical input thereto and ranging in a diameter of from about 0.187 to about 0.50 inches. Production bushing orifices on the other hand are typically from about 0.040 to about 0.110 inches in diameter depending on the size of the glass filaments desired. Both bushings, however, have a well or a containment area for holding molten glass formed by the sides of the bushing and the bottom and bushing connectors or bushing ears are positioning on the sidewalls so that the bushing can be connected to an electrical supply used to maintain glass in the bushing in the molten state. The size of the bushing well formed by the bushing sides and associated ears or connectors all contribute to the overall weight of the bushing. Thus, a drain bushing will range in weight depending on its overall dimensions from 900 to 1300 grams. As will be readily appreciated, in a large modern direct melt plant the complement of drain and production bushings required at the start up of a new furnace means dedicating a large quantity of precious metal to that tank or furnace during the start up procedure. The dedication of such large quantities of precious metal is costly and the fabrication of the drain bushings is also costly as is the handling of the metal after it is used, i.e., remelting and refabricating the metal into other useful forms. Further, since the normal drain bushings have a well area for molten glass they are similar to a production bushing which means that their removal from the forehearth opening is as difficult as it is with a production bushing. Thus, the glass in the bushing and the forehearth opening above the bushing must be frozen by cooling before removal and a considerable amount of time and effort is expended chipping the solidified glass in the bushing opening before the bushing can be removed.

Attempts have been made in the art to utilize other materials such as nickel for drain bushings with mixed success. These nickel bushings operate close to the nickel metal softening point and the electrical characteristics of nickel are inferior to those of the platinum alloys normally used by fiber glass manufacturers. These nickel bushings are also subject to severe wear and must be watched closely and replaced frequently while the start up procedure is being conducted. These bushings also resemble a production bushing and having a glass well are also difficult to remove from the forehearth.

Thus, a need exists to provide a safe, effective drain bushing which can operate to drain the initial glass made in a melting furnace and which will substantially reduce the quantity of precious metal heretofore required of conventional drain bushings. In accordance with the instant invention, a bushing is provided which supplies that need and other benefits as well.

SUMMARY OF THE INVENTION

In accordance with the instant invention, a bushing is provided for draining molten glass from forehearths which is constructed such that it provides a surface adaptable to a bushing forehearth opening and which permits molten glass to pass through it. The surface exposed to the molten glass is constituted of a flat plate of precious metal or alloy thereof. The precious metal surface is supported underneath by suitable support members assembled in a novel manner and provided with suitable insulation members so that the precious metal surface of the bushing is electrically isolated from the support members utilized to support it. The bushing provides a surface in contact with the molten glass contained in the forehearth opening that is resistant to attack by the molten glass but which is substantially reduced in size, weight and fabrication complexity. The construction is also such that replacement of other bushings is simplified in that costly and time consuming chipping of glass from forehearth openings normally required during replacement is minimized or eliminated.

In the bushing assembly of the instant invention, a precious metal plate constructed of platinum or other precious metal or alloys thereof is provided for use in a forehearth opening in place of a normal production bushing and is provided with at least one aperture or hole. Positioned below the precious metal plate member in sequence is an insulation member having apertures or holes corresponding to the hole or holes contained in the precious metal plate and a rigid frame member which surrounds the insulation and has means provided therein for the circulation of cooling fluid. Insulation material convering the upper surface and at least a portion of the sides of the frame is also provided and a support plate or member is positioned below the insulation member and the frame to support both of these structures. The support plate is provided with apertures or holes corresponding to the aperture or holes in the precious metal plate. Means are provided to electrically connect the precious metal plate to a power source and to electrically isolate the support plate from the power source utilized to heat the precious metal plate. Means are also provided to electrically isolate the frame member from the precious metal plate and power source.

BRIEF DESCRIPTION OF THE DRAWINGS

For a more complete understanding of the invention, reference is made to the accompanying drawings in which.

DETAILED DESCRIPTION OF THE DRAWINGS

Turning to the drawings, the invention will now be explained in more detail with specific reference to the embodiment of FIG. 1.

Figure 1:
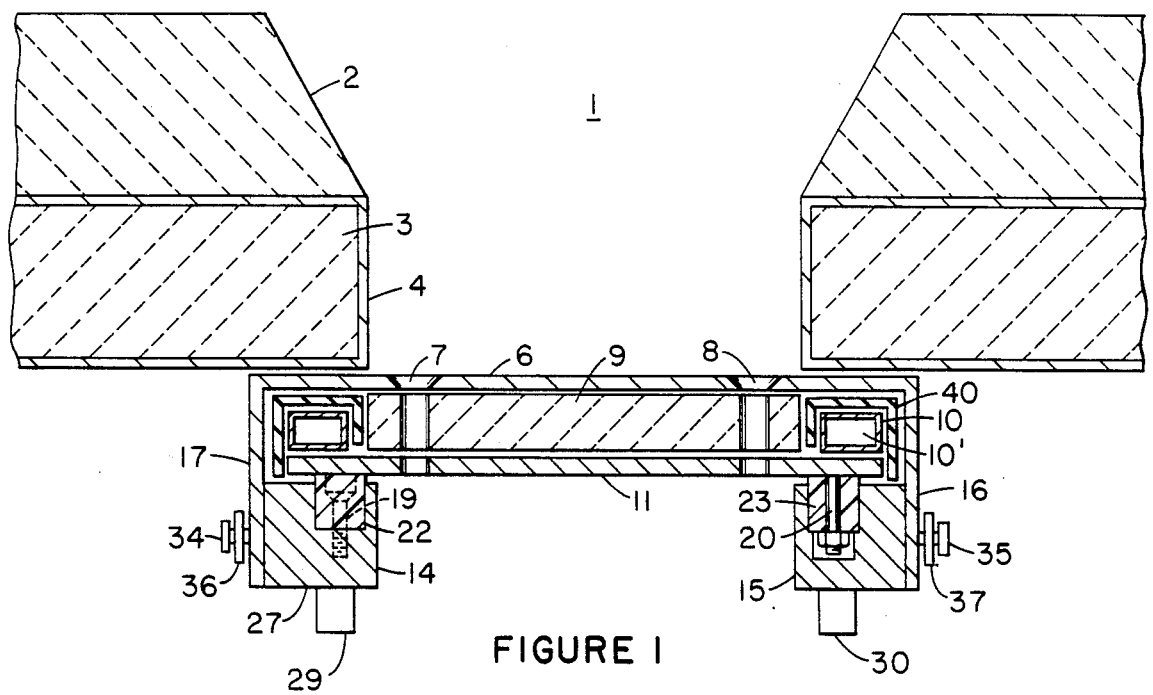
FIG. 1 is a front elevation in section of the bushing of the instant invention and an associated forehearth.

As shown in FIG. 1, a bushing opening 1 is provided between forehearth blocks 2 which are sloped in a downward direction to assist molten glass contained in the forehearth in flowing into the bushing opening 1. Located below the flow blocks 2 are bushing blocks 3 which are lined with a corrosion resistant material 4 such as platinum or platinum-rhodium alloy. Positioned below the bushing blocks 3 and their associated liners 4 is the drain bushing 6 of the instant invention and its associated assembly.

As shown in the drawing, the bushing is comprised of a flat, precious metal plate preferably constructed of platinum or platinum-rhodium alloy, an 80—20 platinum to rhodium alloy being preferred, which is a single unitary piece which has been bent downwardly at the end portions thereof to form electrical connectors 16 and 17 for the bushing 6. Bushing 6 is provided with two holes 7 and 8 which permit molten glass to pass through the surface of bushing 6. While two holes are shown in the drawing, it will be understood that one hole or more than two could be provided in lieu of the two holes shown.

The thickness of the precious metal plate used is subject to wide variations. In general, it should be of a thickness such that it can be drawn into a dimple for tip formation and be thick enough to permit a thermocouple to be welded to its surface. The upper limit of thickness of metal used is in general dictated by the precious metal that can be dedicated to this use over and above what is required to support the glass head on the bushing. In general, plates having a thickness of between about 0.005 to 0.040 can be used, plates having a thickness in the range of 0.010 to 0.020 are preferred since they typically provide substantial savings in the quantities of metal used and adequate strength for most drain bushing applications.

Located below the area of the bushing 6 positioned in the forehearth opening 1 is a refractory insulating member 9 which has two holes 50 and 51 in it corresponding to and communicating with holes 7 and 8 respectively so that molten glass may pass through the refractory insulating member 9. To insure that glass passing from holes 7 and 8 does not contaminate the insulating member 9, holes 50 and 51 are preferably larger in diameter than holes 7 and 8. The insulating member 9 is carried by a frame member 10, typically a sheet metal frame made of steel or other suitable metal, which has a channel 10' therein which functions as a cooling loop for the frame 10. Frame 10 is provided with an insulation cover 40 which electrically isolates frame 10 from the underside of bushing 6 and the connections 16 and 17 formed by the downwardly extending sides of bushing 6.

Frame 10 and insulating member 9 are supported underneath by a rigid metal plate 11, preferably constructed of stainless steel, which is also provided with two holes 41 and 42 which are typically coextensive with channels 50 and 51 and permit molten glass to pass therethrough.

Below support plate 11 on each of its ends are two elongated, generally solid, hard insulation members 22 and 23. These members 22 and 23 perform two essential functions, one to electrically isolate the plate 11 from the bushing 6 and secondly, to act as a means to bias the plate 11 upwardly against the frame 10, insulator 9 to establish a firm attachment of plate 11, frame 10 and insulator 9 to the underside of bushing 6.

For illustrative and explanatory purposes, the drawing shows an end view of element 23 and an intermediate section of element 22. As can be seen element 23 extends beyond the surface of an electrical conductor 15 which is preferably a copper block. The underside of plate 11 is provided with a stud 22 which passes through a drilled hole in the end of element 23. A similar hole (not shown) is drilled on the other end of element 23. Stud 20 has a thread on its terminal end to which a nut is coupled and biased upwardly to firmly seat the end sections of the element 23 against plate 11 at both ends with block 15 being spaced from the plate 11, thereby electrically isolating it from plate 11. A simliar arrangement fo this connection exists on the two ends of element 22, though they are not shown.

The sectional view of element 22 shows the connection of element 22 to the conductive block 14. The element 22 has one or more countersunk holes drilled along its length in which screws 19 are inserted and the screws mate with threaded holes in the conductive block 14. The same holes are provided in element 23 between the ends thereof. Thus, in assembled form the insulation inserts 22 and 23 are rigidly affixed to the conductive blocks 14 and 15 respectively with screw elements such as 19 and are biased against the support plate 11 using studs such as 20 and a suitable nut. Elements 29 and 30 are connectors used to deliver current from an appropriate transformer to the conductive blocks 14 and 15 respectively. The bushing 6 is connected to the blocks 14 and 15 by placing sides 16 and 17 against the blocks and bolting them to the blocks using bolts 34 and 35 and plates 36 and 35 to insure a flat surface connection for the current going from the blocks 14 and 15 to sides 17 and 16.

Figure 2:
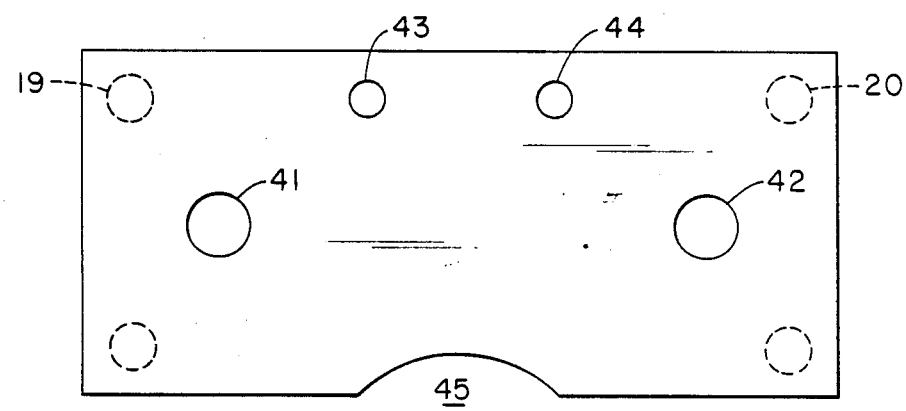
FIG. 2 is a plan view of the support plate utilized in the bushing construction of FIG. 1.

In FIG. 2 a plan view of the steel plate 11 is shown which depicts studs 19 and 20, two being shown on each side. The surface of the plate is provided with two holes 41 and 42 which communicate with the openings 7 and 8 of the bushing plate 6 and channels 50 and 51 of the insulator 9. Two holes 43 and 44 are provided in the upper section of the steel plate for the introduction of thermocouple wires utilized to measure the bushing plate temperatures and a cutout area generally indicated at 45 is provided for the insertion of tubing for the ingress and egress of water to the channel 10' of the bushing frame member 10.

Figure 3:
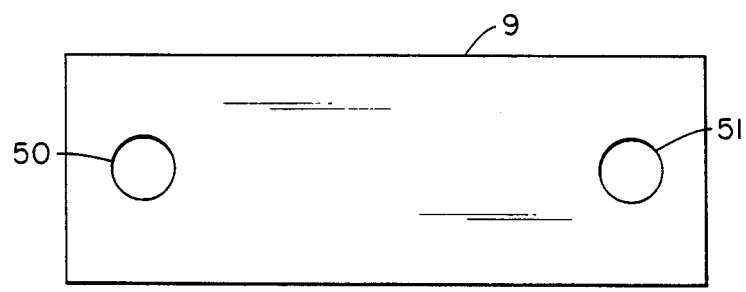
FIG. 3 is a plan view of the ceramic refractory insulation members utilized in the bushing construction of FIG. 1.

FIG. 3 which is a plan view of the insulator 9, shows the two holes 50 and 51 which communicate with the holes 41 and 42 of the steel plate and the holes 7 and 8 of the bushing 6.

Figure 4:
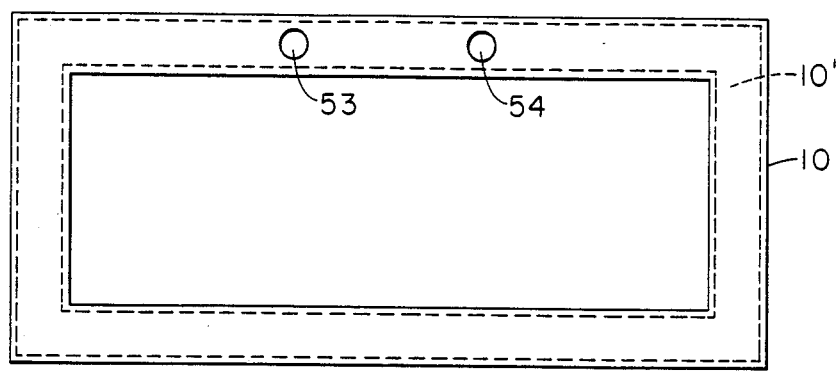
FIG. 4 is a plan view of the frame and cooling loop utilized in the bushing construction of FIG. 1.

FIG. 4 is a plan view of the bushing frame 10 and its associated cooling channel 10', with two openings 53 and 54 provided therein for the introduction of fluid through appropriate tubing and connectors (not shown) to the cooling channel 10' of the frame 10.

Figure 5:
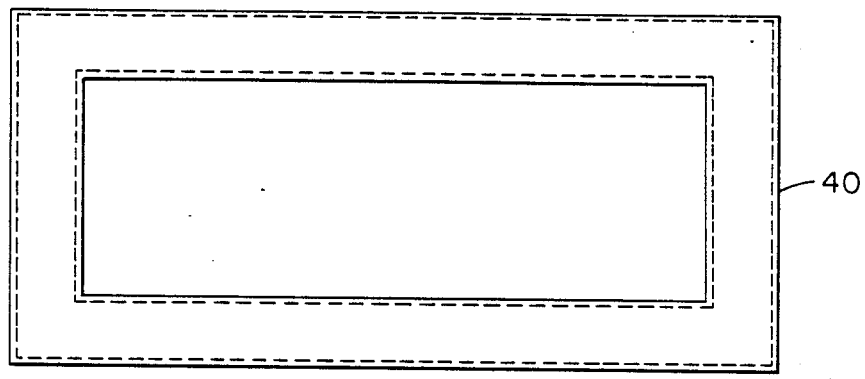
FIG. 5 is a plan view of an insulation insert utilized in bushing construction of FIG. 1.

FIG. 5 is a plan view of the insulating tape member 40 which is utilized to surround the upper and side surfaces of the bushing frame 10 and the bottom portion of the steel plate 11 to electrically insolate it from the bushing 6.

Figure 6:
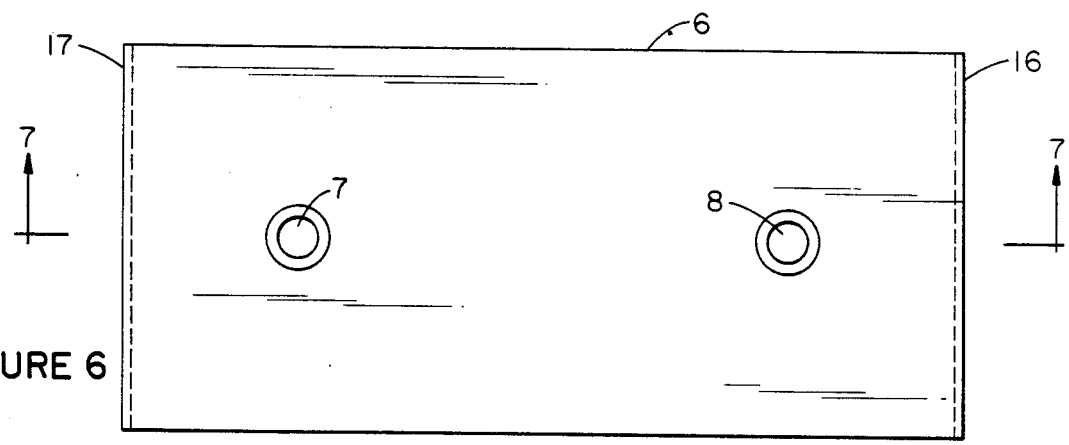
FIG. 6 is a plan view of the precious metal plate utilized in the bushing construction of FIG. 1.

FIG. 6 is a plan view of the bushing 6 showing the holes 7 and 8.

Figure 7:
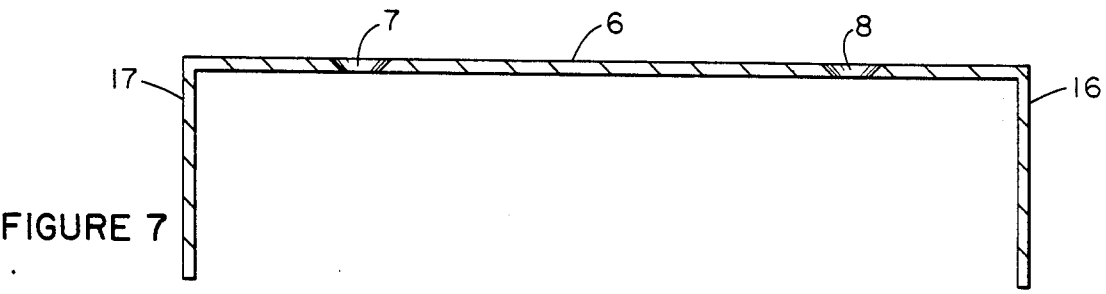
FIG. 7 is a side elevational view of the precious metal plate of FIG. 6.

FIG. 7 is a cross-section of FIG. 6 along lines 7—7 which shows the holes 7 and 8 and the ends 16 and 17 of the bushing 6.

Figure 8:
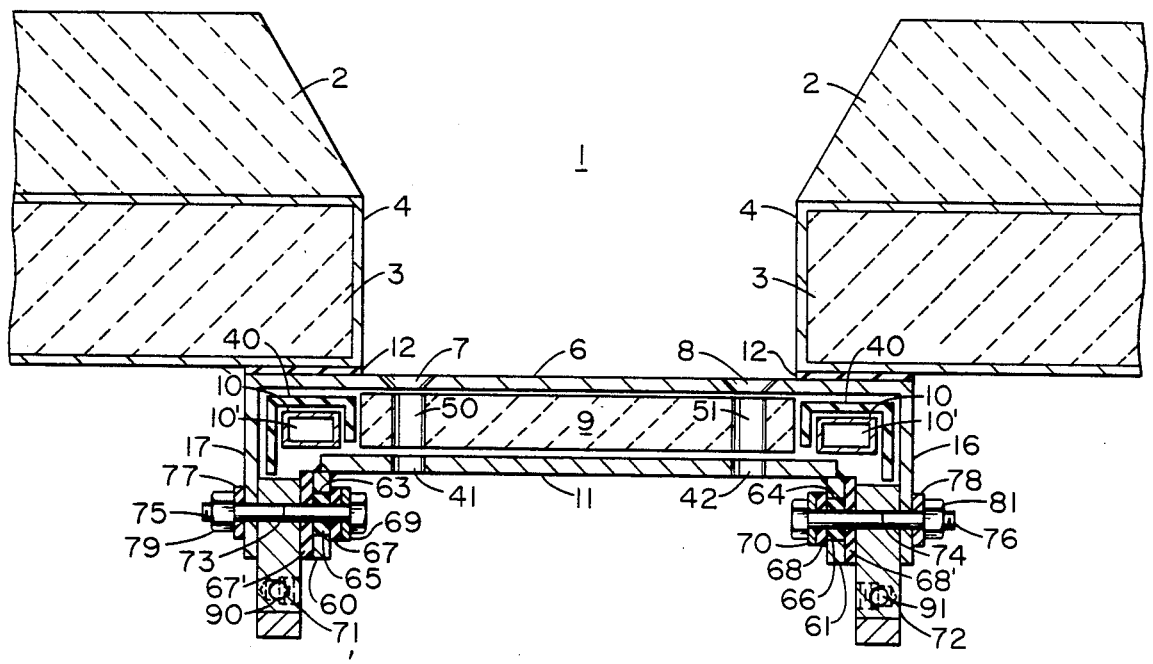
FIG. 8 is a front elevation in section of another embodiment of the bushing of the instant invention and associated forehearth.

A further and preferred embodiment of the bushing of the instant invention is shown in FIG. 8.

As shown therein, a bushing opening 1 is provided between forehearth flow blocks 2, which are sloped in a downward direction to assist molten glass contained in the forehearth to freely flow into the opening 1. Located below the flow blocks 2 are bushing blocks 3 which are preferably lined with a corrosion resistant lining 4 of a material such as platinum or platinum-rhodium alloy. Positioned below the bushing blocks 3 and their liner 4 is a bushing 6. The bushing 6 is comprised of a flat metal plate, preferably constructed of platinum or a platinum-rhodium alloy, 80—20 platinum to rhodium being the most preferred alloy, which is a single unitary price which is bent downwardly at each of its ends to form electrical connector surfaces 16 and 17. Bushing 6, as shown, is provided with two holes 7 and 8 which permit molten glass to pass through the surface of bushing 6. Thus, molten glass passing downwardly through the forehearth area 1 passes through the flat bushing plate 6. A gasket 12 is provided between bushing plate 6 and liner 4 around the periphery of the bushing opening defined by the bushing blocks 3 and serves to seal the bushing 6 against the liner 4. As with the embodiment of FIG. 1, while two holes 7 and 8 are shown in FIG. 8, it will be understood that one hole or more than two may be provided in lieu of the two holes shown.

The bushing 6 can be varied in thickness but is generally of the dimensions referred to above for the FIG. 1 embodiment.

Located below the area of the bushing 6 positioned in the forehearth opening 1 is a fractory insulating member 9 which has two holes 50 and 51 in it corresponding to and communicating with holes 7 and 8 respectively so that molten glass may pass through the refractory insulating member 9. To insure that glass passing from holes 7 and 8 does not contaminate the insulating member 9, holes 50 and 51 are preferably larger in diameter than holes 7 and 8. The insulating member 9 is carried by a frame member 10, typicallya sheet metal frame made of steel or other suitable metal, which has a channel 10' therein which functions as a cooling loop for the frame 10. Frame 10 is provided with an insulation cover 40 which electrically isolates frame 10 from the underside of bushing 6 and the connections 16 and 17 formed by the downwardly extending sides of bushing 6.

Frame 10 and insulating member 9 are supported underneath by a rigid metal plate 11, preferably constructed of stainless steel, which is also provided with two holes 41 and 42 which are typically coextensive with channels 50 and 51 and permit molten glass to pass therethrough.

Below the support plate 11 on each end is the electrical connection assembly to provide power to the ends 16 and 17 of bushing 6. As shown, brackets 60 and 61 are provided on each end of plate 11 and are welded or otherwise affixed thereto. The brackets 60 and &1 in addition to providing support for the electrical connections also serve to help center the bushing in a bushing frame, not shown.

Holes 63 and 64 are provided in brackets 60 and 61 respectively and the holes 63 and 64 have insulating bushings 65 and 66 therein. The bushings 65 and 66 are capped on each side with insulating washers, 67 and 67', and 68 and 68' respectively. The washers 67 and 68 are covered by metal washers 69 and 70 repectively.

The bus bars 71 and 72 have drilled holes 73 and 74 respectively through which bolts 75 and 76 pass. Metal washers 77 and 78 are positioned over bolts 75 and 76 on the outside surface of connectors 17 and 16 respectively. Nuts 79 and 80 are used to draw the assembly on connector 17 to a tight fit. Nuts 81 and 82 are used to draw the assembly on connector 16 to a tight fit.

The holes 90 and 91 shown on the bus bars 71 and 72 respectively are used to flow cooling water in the bus bars 71 and 72 to remove excess heat.

The assembly of the embodiment of FIG. 8 is similar to FIG. 1 and the essential differences between the two embodiments is the electrical connection.

As will be readily appreciated, the bushing of the instant invention is easy to assemble and low in cost.

Using the flat plate concept, a drain bushing with two holes on the surface and corresponding holes in the support plate and insulator was constructed in accordance with this invention. The bushing weighing 300 grams as opposed to the 900 grams normally required for the samesize drain bushing, was built and operated successfully by the Applicant. No leaking of glass occurred and the bushing was removed from the forehearth opening without requiring the extensive glass chipping for disengagement normally necessary to remove a bushing from service.

Many modifications of the invention may be made without departing from the scope of the instant invention. Thus, in a drain bushing application, the precious metal plate may contain one or more holes, if desired, provided the insulator and support plates are provided with corresponding holes through which glass may flow unimpeded from the surface of the precious metal plate through that plate and the underlying insulator and support plate. Similarly, if the flat precious metal plate is used as a production bushing, the underside of the plate will be provided with tips at each of the holes fashioned in the plate and sized to produce fibers. Typically, these holes and their associated tips will be arranged in rows as in a conventional bushing. Again, it will be necessary to provide openings below each tip or an opening for a row of tips in the insulator and support plate corresponding to, preferably greater than, the tip opening or row so that glass can flow unimpeded through the tips or all of the tips in a given row of tips, the insulator and the support plate to an appropriate collector such as a winder or chopping machine. In this type of bushing, i.e., a production bushing producing a multiplicity of filaments, the face plate on which the tips are located will be bent downwardly at its ends as shown herein to provide the electrical connection to the power supply.

In addition to providing a low cost method of providing drain bushings for furnace start ups, the instant invention also includes a novel electrical connection system for any fiber glass forming bushing which can be fabricated such that the faceplate of the bushing can be bent in a downward fashion to provide for the electrical connection shown by the instant invention. Thus, in fabricating a fiber glass forming bushing for the production of products, the bottom plate of the bushing can be extended beyond the end walls and bent in a downward fashion such as shown in FIG. 1 of the drawings and a simple electrical connection can be made utilizing the novel electrical connection system shown in FIG. 1. This eliminates the fabrication of the expensive bushing connectors at the bushing side walls normally employed in a fiber glass forming bushing such as those shown, as for example, elements 33 and 37 in FIG. 3, in U.S. Pat. No. 3,331,673.

Elimination of heavy weight electrical connectors in addition to removing a substantial portion of the platinum necessary in fabricating a bushing also eliminates a trouble area in most fiber glass forming bushings. Bushing connectors on production bushings are a point on the bushings where frequently cracks occur along the weld area used to attach the connector to the bushing sidewalls. Bushings are frequently taken out of service because of the stress placed on the bushing connectors by the associated electrical connecting systems which exert substantial weight forces on the bushing connectors. By utilizing the bushing faceplate as part of the electrical connection, these welded areas are eliminated and bushings can be satisfactorily connected to an electric power source to maintain the bushings at the desired temperature for forming a particular glass fiber without risking a failure along a weld point.

Thus, while the invention has been described with reference to certain specific examples and illustrative embodiments, it is not intended that it be limited thereby except insofar as appears in the accompanying claims.

I claim:

1. A bushing assembly comprising a flat precious metal plate being provided with at least one hole therein, an insulation member positioned below said precious metal plate and having at least one hole therein surrounding the hole in said precious metal plate, a frame member surrounding said insulation member and having means to circulate cooling fluid therethrough, an insulator covering the upper surface and at least a portion of the sides of said frame, a support plate positioned below said insulation member and said frame and having at least one hole therein communicating with the holes of said precious metal plate and said insulation member, means to electrically connect said precious metal plate to a power source and means to attach said assembly to a source of molten glass with the precious metal plate surface facing said molten glass source.

2. The bushing of claim 1 wherein said flat precious metal plate is between 0.005 and 0.040 inch in thickness.

3. The bushing of claim 1 wherein said flat precious metal plate is between 0.010 and 0.020 inch in thickness.

4. The bushing of claim 1 wherein the holes in said insulation member and said support plate are of a diameter greater than the diameter of the hole in said precious metal plate.

5. The bushing of claim 2 wherein the holes in said insulation member and said support plate are of a diameter greater than the diameter of the hole in said precious metal plate.

6. The bushing of claim 3 wherein the holes in said insulation member and said support plate are of a diameter greater than the diameter of the hole in said precious metal plate.

7. A bushing assembly including a flat, precious metal plate, said plate being bent downwardly at opposing ends and having at least one hole provided provided therein to permit molten glass to go through the plate, an insulation member positioned below and in contact with said precious metal plate and covering a substantial portion of said plate between the downwardly bent ends thereof, a cooling channel in the form of a frame surrounding said insulation member and the periphery of said precious metal plate between said downwardly bent ends thereof, a support member affixed to the insulation member and said cooling channel, said support member and insulation member having holes aligned with and sized such that glass passing through said precious metal plate passes through said insulation member and said support member, means to attach said assembly to a source of molten glass with said precious metal surface facing said molten glass source, and means to attach said downwardly bent ends of said precious metal plate to a power source.

8. The bushing of claim 7 where said flat precious metal plate is between 0.005 and 0.040 inch in thickness.

9. The bushing of claim 7 wherein said flat precious metal plate is between 0.010 and 0.020 inch in thickness.

10. The bushing of claim 7 wherein the holes in said insulation member and support member are larger in diameter than the hole in said flat precious metal plate.

11. The bushing of claim 8 wherein the holes in said insulation member and support member are larger in diameter than the hole in said flat precious metal plate.

12. The bushing of claim 9 wherein the holes in said insulation member and support member are larger in diameter than the hole in said flat precious metal plate.

13. A drain bushing for use in a glass fiber forehearth comprising a precious metal plate having at least one aperture therein, insulation means below said plate, said insulator means having an aperture positioned below the said plate aperture, a frame surrounding said insulation means and provided with internal cooling, a support plate positioned below said insulator member and frame, said support plate having an aperture positioned below the aperture of said insulator means, all said apertures being aligned and sized to provide for free flow of glass from the precious metal plate through the insulation means and support plate without touching the insulation means or support plate, means to electically connect said precious metal plate to a power source and means to electrically isolate said support plate and frame member from said precious metal plate and said power source.

14. The bushing of claim 13 wherein said precious metal plate is between 0.005 and 0.040 inch in thickness.

15. The bushing of claim 13 wherein said precious metal plate is between 0.010 and 0.020 inch in thickness.

16. The bushing of claim 13 wherein the apertures in said insulator means and said support plate are of a diameter larger than the diameter of the aperture in said precious metal plate.

17. The bushing of claim 14 wherein the apertures in said insulator means and said support plate are of a diameter larger than the diameter of the aperture in said precious metal plate.

18. The bushing of claim 15 wherein the apertures in said insulator means and said support plate are of a diameter larger than the diameter of the apertures in said precious metal plate.

* * * * *